United States Patent
Potter et al.

(10) Patent No.: US 9,938,712 B2
(45) Date of Patent: Apr. 10, 2018

(54) HIGH THERMAL RESISTIVITY INSULATION MATERIAL WITH OPACIFIER UNIFORMLY DISTRIBUTED THROUGHOUT

(75) Inventors: Russell M. Potter, Hebron, OH (US); Patrick M. Gavin, Newark, OH (US); William J. Grieco, New Albany, OH (US); Manoj K. Choudhary, Reynoldsburg, OH (US)

(73) Assignee: OWENS CORNING INTELLECTUAL CAPITAL, LLC, Toledo, OH (US)

( * ) Notice: Subject to any disclaimer, the term of this patent is extended or adjusted under 35 U.S.C. 154(b) by 106 days.

(21) Appl. No.: 13/433,721

(22) Filed: Mar. 29, 2012

(65) Prior Publication Data

US 2012/0251796 A1  Oct. 4, 2012

Related U.S. Application Data

(60) Provisional application No. 61/469,251, filed on Mar. 30, 2011.

(51) Int. Cl.
*E04B 1/76* (2006.01)
*C03C 25/26* (2006.01)
(Continued)

(52) U.S. Cl.
CPC .............. *E04B 1/7662* (2013.01); *B32B 5/26* (2013.01); *C03B 37/0206* (2013.01);
(Continued)

(58) Field of Classification Search
CPC ......... E04N 1/7658–1/767; B32B 5/26; B32B 5/28; B32B 2262/10–2262/108;
(Continued)

(56) References Cited

U.S. PATENT DOCUMENTS 3,014,872 A  12/1961 Scott
4,224,373 A   9/1980 Marzocchi
(Continued)

FOREIGN PATENT DOCUMENTS

WO  200017120 A1  3/2000
WO  200017123 A1  3/2000
WO  2009112784 A1  9/2009

OTHER PUBLICATIONS

Composites One, Dec. 22, 2009, http://web.archive.org/web/20091222080703/http://www.compositesone.com/basics.htm.*

(Continued)

*Primary Examiner* — Frank J Vineis
(74) *Attorney, Agent, or Firm* — Calfee, Halter & Griswold LLP

(57) ABSTRACT

A fibrous insulation product with improved thermal resistance and method of making it are provided. A plurality of base fibers (e.g. glass) are formed into an insulation product, which may be bindered or unbonded. At least one infrared opacifying agent, such as soot, carbon black or graphite, is applied to the fibrous insulation product such that the base fibers are substantially uniformly coated with opacifying agent. The opacifying agent may be applied, for example, from a fluid suspension or by pulling the fiber through a sooty flame. When opacifying agent applied via a suspension and a binder is desired, it is preferable to avoid binder dispersions that can dislocate the opacifying agent. Alternative binder applications may include co-mingling of base fibers with binder fibers, or other physical or mechanical distributions.

17 Claims, 6 Drawing Sheets

(51) Int. Cl.
*C03B 37/10* (2006.01)
*C03B 37/02* (2006.01)
*C03C 25/44* (2006.01)
*B32B 5/26* (2006.01)
*C03B 37/04* (2006.01)
*C03B 37/075* (2006.01)

(52) U.S. Cl.
CPC ............ *C03B 37/04* (2013.01); *C03B 37/048* (2013.01); *C03B 37/0753* (2013.01); *C03B 37/10* (2013.01); *C03C 25/26* (2013.01); *B32B 2262/06* (2013.01); *B32B 2262/101* (2013.01); *B32B 2264/108* (2013.01); *E04B 2001/7687* (2013.01); *Y10T 428/24802* (2015.01); *Y10T 442/2926* (2015.04)

(58) Field of Classification Search
CPC .................. B32B 2264/10–2264/108; C03C 25/26–25/36; C03C 25/42–25/46; C03B 37/10; C03B 37/04–37/055; C03B 37/0206; C03B 37/0753; Y10T 428/24802; E04B 2001/7687; E04B 1/7658–1/767
USPC .................. 442/172–180, 63, 131, 133, 136; 428/195.1, 196, 206, 208, 209, 375, 376, 428/378, 379, 381, 384, 388
See application file for complete search history.

(56) References Cited

U.S. PATENT DOCUMENTS

| | | |
|---|---|---|
| 4,363,738 A | 12/1982 | Kummermehr |
| 4,692,363 A | 9/1987 | Reiss et al. |
| 4,762,749 A | 8/1988 | Schuetz |
| 4,810,276 A | 3/1989 | Gilliland |
| 4,921,894 A | 5/1990 | Shumate |
| 5,322,711 A | 6/1994 | Gabor et al. |
| 5,458,822 A | 10/1995 | Bakhshi et al. |
| 5,490,961 A | 2/1996 | Bakhshi et al. |
| 5,523,031 A | 6/1996 | Ault et al. |
| 5,523,032 A | 6/1996 | Ault et al. |
| 5,736,475 A | 4/1998 | Bakhshi et al. |
| 6,699,945 B1 | 3/2004 | Chen et al. |
| 6,884,849 B2 | 4/2005 | Chen et al. |
| 2001/0049421 A1* | 12/2001 | Burlone et al. ............... 525/427 |
| 2004/0121152 A1* | 6/2004 | Toas ............................. 428/374 |
| 2004/0161993 A1 | 8/2004 | Tripp et al. |
| 2005/0147805 A1 | 7/2005 | Yang et al. |
| 2006/0078720 A1 | 4/2006 | Toas et al. |
| 2006/0257639 A1 | 11/2006 | Bianchi et al. |
| 2008/0171201 A1 | 7/2008 | Houpt et al. |
| 2008/0203602 A1 | 8/2008 | Riedel et al. |
| 2011/0086567 A1 | 4/2011 | Hawkins et al. |

OTHER PUBLICATIONS

P.K. Mallick, P. Composites Engieering Handbook, CRC Press, Mar. 19, 1997.*
International Search Report and Written Opinion, Application No. PCT/US12/31127 filed Mar. 29, 2012, dated Jul. 6, 2012.
Acheson Industries, Inc., Product Data Sheet, Aquadag E, 2007, http://www.achesonindustries.com.
Acheson Industries, Inc., Technical Process Bulletin, Aquadag E, Aquadag® is a registered trademark of Henkel.
M. E. Taylor Engineering, Inc., Material Safety Data Sheet, MSDS No. BHRTD, Name: Aquadag Colloidal Graphite, Other Names: Graphite in Water, Related Part No. CP, Revision Date Mar. 10, 2008, pp. 1-4, www.semicro.org.

* cited by examiner

HIGH THERMAL RESISTIVITY INSULATION MATERIAL WITH OPACIFIER UNIFORMLY DISTRIBUTED THROUGHOUT

CROSS REFERENCE TO RELATED APPLICATIONS

This application is claims the benefit of provisional application 61/469,251 filed Mar. 30, 2011 and bearing the same title.

BACKGROUND OF THE INVENTION

This invention relates to an insulation material having improved thermal resistivity. More particularly, this invention relates to improving the capability of the insulation material to block the transfer of radiant heat by distributing the opacifier more uniformly throughout the fibrous matrix.

Insulation products made from fibrous glass filaments are found in many applications, including for example, residential and commercial building insulation, high temperature appliances, heating and air conditioning ducts and hot and cold temperature plumbing. Fibrous glass insulation products are used to block the transfer of heat which can be transferred by various methods including convection, conduction and radiation.

Radiation heat transfer occurs when heat is sent through space and is capable of traveling to an object where the heat can be reflected, absorbed or transmitted. For glass fibrous insulation products at least, most of the energy involved in radiation heat transfer is in the mid-infrared region of the electromagnetic spectrum. Examples of radiation heat transfer include the infrared portion of sunlight traveling from the sun to an object on earth and the transfer of heat from a fireplace across a room. Radiant heat does not need a medium, such as air, water or metal to take place.

Many types of insulation can block a portion of the transfer of heat from radiation by absorbing or reflecting the radiation. Silicate glass fibers absorb strongly in the range 8-12 µm and 16-25 µm, dramatically reducing the amount of heat transferred by radiation in these regions. Radiation at wavelengths longer than about 25 µm does not contribute significantly to heat transfer regardless of the glass properties. However, at wavelengths less than 8 µm, and between 12 and 16 µm, silicate glasses typically provide little blocking to radiation. Although boron is typically added to glass wool insulation, its absorption will block radiation only near 7 µm. The near- to mid-infrared wavelength region between about 2 µm and about 8 µm is particularly important to block for glass fibrous insulation at typical usage temperatures.

The literature discloses that opacifying particulates such as graphite or carbon black may be distributed in insulation products to enhance the absorption and/or reflectance of radiant energy. See, for example, U.S. Pat. No. 4,363,738 to Kummermehr, U.S. Pat. No. 4,692,363 to Reiss, et al., and U.S. Pat. No. 4,762,749 to Schuetz. Schuetz is unique in teaching that an opacifier may be incorporated into an extrudable thermoplastic fiber that can be comingled with a "bulking" thermoplastic fiber to form a fibrous product. Schuetz also mentions the IR wavelength range of 7-24 µm as being important. However, comingling opacified thermoplastic fibers with bulk fibers as a means to reduce the overall heat transfer would not be completely satisfactory for at least two reasons. First, the thermoplastic softens and melts in the manufacturing process and tends to become spherical in shape rather than fibrous. The resulting reduction in surface area eliminates essentially all the thermal benefit. Second, the comingling of two fibers types results in opacification of only a fraction of the fibers present in the insulation, which provides much less thermal benefit than the opacification of substantially all the fibers.

The ability to distribute opacifier particles in fibrous matrices of inorganic mineral fibers has met with even less success. Generally, to improve their loft and handling ability, fibrous glass products are sprayed with a chemical binder composition that binds the glass fibers together. Application of opacifier after binder is applied is impractical as a means to permit the opacifier to distribute into the fibrous matrix. But when binder is applied as a solution—as it typically is—after the opacifier, it tends to wash previously applied opacifier to the nodes or intersections of fibers, where it tends to concentrate. This also fails to provide uniform distribution of opacifier.

It would be advantageous if insulation made from glass fibers could be improved to distribute opacifier more uniformly to block the transfer of heat from radiation more efficiently.

SUMMARY

Broadly, the invention provides a method of manufacturing a fibrous glass insulation product with improved thermal resistivity.

In a first aspect, the invention provides a method of making a fibrous insulation product, comprising coating an opacifying agent onto inorganic base fibers to provide an opacified base fiber that is substantially uniformly coated with opacifying agent, wherein the fibrous insulation product has greater thermal resistivity than a substantially similar fibrous product made without an opacified base fiber that is substantially uniformly coated. The substantially uniform coating, as defined herein, is different from the accumulation of opacifier at fiber-fiber nodes as when opacifier is applied with binder dispersions.

In a second aspect, the invention encompasses the fibrous insulation product made by the process described above. For example, a fibrous product comprising a matrix of inorganic base fibers coated with an opacifying agent to provide an opacified base fiber that is substantially uniformly coated with opacifying agent, wherein the fibrous insulation product has greater thermal resistivity than a fibrous product not having an opacified base fiber that is substantially uniformly coated.

In either the method or the fibrous product, the invention may further comprise a binder as described below.

In a particular variation containing a binder, the fibrous insulative product comprises: a plurality of base fibers randomly oriented in a fibrous pack, the base fibers being substantially uniformly coated with an opacifying agent; and a cured thermosetting binder securing the opacified base fibers in random orientation within the fibrous pack; wherein the thermosetting binder originated as a plurality of binder fibers intermingled with the opacified base fibers, the binder fibers consisting essentially of curable thermoset compounds in a fiberizable aqueous dispersion, said dispersion having at least one of the following properties: (a) a viscosity of at least about 30 cps at room temperature; and (b) a concentration of solids of at least about 35%.

In another method aspect, the invention encompasses a method of making a fibrous insulation product, comprising:
applying an opacifying agent to inorganic base fibers to provide an opacified base fiber that is substantially uniformly coated with opacifying agent;

comingling the opacified base fiber with a binder fiber to form a matrix of opacified base fibers and binder fibers; and curing the binder to bind the opacified base fibers in the matrix.

In any of the methods and products described above, the opacifying agent may be selected from carbon black, graphite, nanographite, graphene, iron oxide, chrome oxide, silicon carbide, and a metalized substrate and it may be applied as a substantially uniform coating layer, such as one applied by a sooty flame, or by spraying or applying a size composition on the fibers. Other materials with appropriate optical constants in the near to mid infrared region may also be used as opacifying agents. The opacifying agent may consist of a thin layer or coating or it may consist of a series of particles that, in combination, approximate a thin layer or coating. Particles may be planar in shape. Ideally, the fibers are nearly completely coated with opacifying agent, from about 100% coated to about 50% coated. While gaps in coating may exist, they are minimal such that an average distance of uncoated fiber between opacifier particles or layers is in a range from about 0.1 µm to no more than about 50 µm, typically from about 2 µm to about 25 µm or from about 2 to about 15 µm. More generally, the maximum gap of exposed base fiber between particles or particle groups should generally not exceed 3-10 times the diameter of the fiber.

In any aspect involving a binder, the binder fiber may be a thermoplastic or thermosetting binder, and in either case may be supplied as a separate fiber comingled with an opacified inorganic fiber. When fibers are comingled, it can be done by means of co-fiberization, wet-laid dispersion, air-laid dispersion, or carding. In some alternative embodiments, the binder may be applied as a sprayed composition. Other alternative means for applying binder are also encompassed. When a thermoset binder fiber is used, it may be fiberized from an aqueous dispersion having at least one of the following properties: (a) a viscosity of at least about 30 cps at room temperature; and (b) a concentration of solids of at least about 35%. In other embodiments, the aqueous dispersion may have a viscosity of at least about 50 cps, 100 cps, 1000 cps, or even 10,000 cps at room temperature; or it may have a solids content of at least about 50%, 75%, 80% or 90%.

It is an object of the invention to provide a fibrous insulation product in which the base fibers are substantially uniformly coated with opacifying agent, such that the fibrous insulation product has greater thermal resistivity than a fibrous product not having an opacified base fiber, or even a product having opacified fiber, but wherein the opacifying agent is not substantially uniformly distributed along the length of the fiber.

Various objects and advantages of this invention will become apparent to those skilled in the art from the following detailed description of the invention, when read in light of the accompanying drawings.

DETAILED DESCRIPTION

Figure 1:
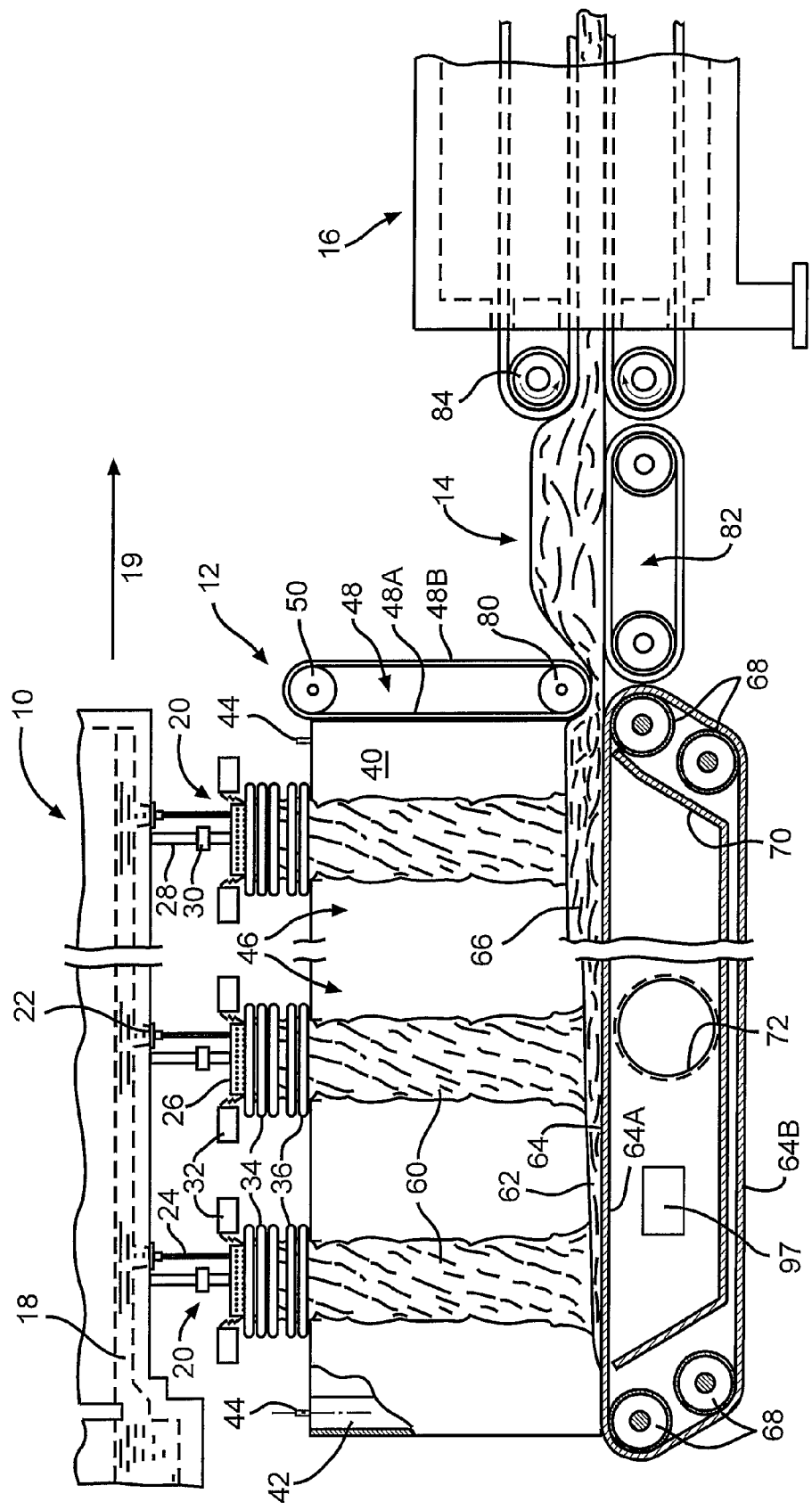
FIG. 1 is a schematic elevational view, partially in cross-section, of an apparatus for making fibrous insulation material according to the method of the invention.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All references cited herein, including published or corresponding U.S. or foreign patent applications, issued U.S. or foreign patents, or any other references, are each incorporated by reference in their entireties, including all data, tables, figures, and text presented in the cited references. In the drawings, the thickness of the lines, layers, and regions may be exaggerated for clarity.

Unless otherwise indicated, all numbers expressing ranges of magnitudes, such as angular degrees or sheet speeds, quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements. All numerical ranges are understood to include all possible incremental sub-ranges within the outer boundaries of the range. Thus, a range of 30 to 90 µm discloses, for example, 35 to 50 µm, 45 to 85 µm, and 40 to 80 µm, etc.

Fibrous insulation products are designed to block the transfer of heat. Heat may be transferred through a fibrous glass pack by three distinct methods: convection, conduction and radiation. Convection, i.e. flow of fluid (air) through the pack includes flow driven by external forces, such as wind, fans or blowers and natural or free flow driven by conditions within the pack, such as thermal or density gradients; similarly, conduction includes conduction by air, glass or any other compounds present within the pack. The term "R-value" is the commercial unit used to measure the effectiveness of thermal insulation and is the reciprocal of its thermal conductance which, for "slab" materials having substantially parallel faces, is defined as the rate of flow of thermal energy (BTU/hr or Watt) per unit area (square foot=$ft^2$ or square meter=$m^2$) per degree of temperature difference (Fahrenheit or Kelvin) across the thickness of the slab material (inches or meters). Inconsistencies in the literature sometimes confuse the intrinsic thermal properties resistivity, r, (and conductivity, k), with the total material properties resistance, R, (and conductance, C), the difference being that the intrinsic properties are defined as being per unit thickness, whereas resistance and conductance (often modified by "total") are dependent on the thickness of the material, which may or may not be 1 unit. This confusion, compounded by multiple measurement systems, produces an array of complex and confusing units the most common of which are:

|  | English (inch-pound) | Metric/SI units |
|---|---|---|
| Intrinsic resistivity, r (conductivity, k, is reciprocal) | $\dfrac{hr * ft^2 * °F.}{BTU * in}$ | $\dfrac{K * m}{W}$ |
| Total material resistance, R (conductance, C, is reciprocal) | $\dfrac{hr * ft^2 * °F.}{BTU}$ | $\dfrac{K * m^2}{W}$ |

For ease of comparisons of materials of differing thicknesses, the building industry sometimes reports thermal resistance (or conductance) per unit thickness (e.g. per inch) effectively converting it to thermal resistivity (conductivity), but retains the traditional symbol, R or R-value. It is further observed that the "conductivity" referenced above includes the total heat transfer by any of the mechanisms described above, not just by conduction. Thermal conductivity and resistivity may be measured using commercial instruments like the FOX instruments (LaserComp, Saugus, Mass.) according to ASTM C518 protocols.

Although a typical fibrous insulation product is the flexible batts or blankets used for residential wall and ceiling insulation, the term "fibrous product" or "fibrous insulation product" is much broader and also encompasses insulation used for commercial buildings, including metal buildings; for high temperature appliances, such as ovens, stoves, dishwashers, washers and dryers; for heating and air conditioning ducts, both rigid and flexible; for water heaters, steam lines, and other hot and cold temperature plumbing; and for ceiling boards and tiles and other rigid board insulation products designed to block the transfer of heat.

The description and drawings disclose an improved fibrous glass insulation product and a method for manufacturing the improved fibrous glass insulation product. It is to be understood that the invention can be carried out using fibers made from any molten mineral material, such as molten rock, slag and basalt.

General Rotary Fiberization Process for Insulative Products

FIG. 1 illustrates a glass fiber insulation product manufacturing line including a forehearth 10, forming hood component or section 12, a ramp conveyor section 14 and a curing oven 16. Molten glass from a furnace (not shown) is led through a flow path or channel 18 to a plurality of fiberizing stations or units 20 that are arranged serially in a machine direction, as indicated by arrow 19 in FIG. 1. At each fiberizing station, holes 22 in the flow channel 18 allow a stream of molten glass 24 to flow into a spinner 26, which may optionally be heated by a burner 27 (shown in FIG. 2). Fiberizing spinners 26 are rotated about a shaft 28 by motor 30 at high speeds such that the molten glass is forced to pass through tiny holes in the circumferential sidewall of the spinners 26 to form primary base fibers 91 (see FIG. 2). Blowers 32 direct a gas stream, typically air, in a substantially downward direction to impinge the fibers, turning them downward and attenuating them into secondary fibers that form a veil 60 that is forced downwardly. The fibers are distributed in a cross-machine direction by mechanical or pneumatic "lappers" (not shown), eventually forming a fibrous layer 62 on a porous conveyor 64. The layer 62 gains mass (and typically thickness) with the deposition of additional fiber from the serial fiberizing units, thus becoming a fibrous "pack" 66 as it travels in a machine direction 19 through the forming area 46.

One or more cooling rings 34 spray coolant liquid, such as water, on veil 60 to cool the fibers within the veil. Other coolant sprayer configurations are possible, of course, but rings have the advantage of delivering coolant liquid to fibers throughout the veil 60 from a multitude of directions and angles. A binder dispensing system includes binder sprayers 36 to spray binder onto the base fibers of the veil 60. Illustrative coolant spray rings and binder spray rings are disclosed in US Patent Publication 2008-0156041 A1, to Cooper. Each fiberizing unit 20 thus comprises a spinner 26, a blower 32, one or more cooling liquid sprayers 34, and one or more binder sprayers 36. FIG. 1 depicts three such fiberizing units 20, but any number may be used. For insulation products, typically from two to about 15 units may be used in one forming hood component for one line.

The forming area 46 is further defined by side walls 40 and end walls 48 (one shown) to enclosed a forming hood. The side walls 40 and end walls 48 are each conveniently formed by a continuous belt that rotates about rollers 44 or 50, 80 respectively. The terms "forming hoodwall", "hoodwall" and "hood wall" may be used interchangeably herein. Inevitably, binder and fibers accumulate in localized clumps on the hoodwalls and, occasionally, these clumps may fall into the pack and cause anomalous dense areas or "wet spots" that are difficult to cure.

The conveyor chain 64 contains numerous small openings allowing the air flow to pass through while links support the growing fibrous pack. A suction box 70 connected via duct 72 to fans or blowers (not shown) are additional production components located below the conveyor chain 64 to create a negative pressure and remove air injected into the forming area. As the conveyor chain 64 rotates around its rollers 68, the uncured pack 66 exits the forming section 12 under exit roller 80, where the absence of downwardly directed airflow and negative pressure (optionally aided by a pack lift fan, not shown) allows the pack to regain its natural, uncompressed height or thickness. A subsequent supporting conveyor or "ramp" 82 leads the fibrous pack toward an oven 16 and between another set of porous compression conveyors 84 for shaping the pack to a desired thickness for curing in the oven 16.

The uncured pack 66 has an approximate thickness in a range from about 1 inch to about 24 inches (about 2.5 cm to about 60 cm) and an area weight in a range from about 0.15 lbs/ft$^2$ to about 0.70 lbs/ft$^2$, depending on the desired R-value and intended use.

The term "fibrous products" is general and encompasses a variety of compositions, articles of manufacture, and manufacturing processes. "Fibrous products" may be characterized and categorized by many different properties; density for example, which may range broadly from about 0.2 pounds/cubic foot ("pcf") to as high as about 10 pcf, depending on the product. Low density flexible insulation batts and blankets typically have densities between about 0.2 pcf and about 5 pcf, more commonly from about 0.3 to about 4 pcf and are often used for residential insulation in walls, attics and basements. Fibrous products also include higher density products having densities from about 1 to about 10 pcf, more typically from about 2 or 3 pcf to about 8 pcf, such as boards and panels or formed products. Higher density insulation products may be used in industrial and/or commercial applications, including but not limited to metal building wall and ceiling insulation, pipe or tank insulation, insulative ceiling and wall panels, duct boards and HVAC insulation, appliance and automotive insulation, etc. Not surprisingly, thermal conductivity is a function of density.

Other properties useful for categorization of fibrous products include: shape, rigidity and method of manufacture. Residential insulation batts are typically quite flexible and they can be compressed into rolls or batts while recovering their "loft" upon decompression. Binder is important in some fibrous products, but other fibrous products contain no binder at all. Such un-bonded products are sometimes referred to as glass wool or "loose-fill" insulation and may be the type that is blown into attics and some wall cavities. Other fibrous products, such as ceiling tiles, wall panels, foundation boards and certain pipe insulation to mention a few, are quite rigid and inflexible by design. These products will flex very little and are unlikely to be adapted or conformed to a particular space. Flexible fibrous products can be forced to assume conforming shapes, while others are formed and shaped for a specific purpose. In some embodiments, the shape is substantially planar, as in duct boards, ceiling tiles and some wall insulation. In other embodiments, the fibrous insulation product is manufactured with a particular shape (e.g. cylindrical) suitable for a particular size conduit, pipe or tank. In other cases, specific shapes and cutouts, often die-cut, are included in certain appliance insulation products, automotive insulation products and the like. Other shapes may be created with nonwoven textile insulation products.

In any of the embodiments, the inorganic fiber, typically glass, has an average diameter in the range of from about 1 to about 25 μm, more typically from about 2 to about 15 μm. In certain embodiments, the diameter of the glass fiber is from about 3 to about 10 μm.

As the pack traverses the oven 16, heat and fans (not shown) are used to distribute heat throughout the pack to cure the binder. Typically, an oven 16 may comprise from 1 to 6 zones and the flow of heated air may be upward or downward in any particular zone. After the pack is cured (now known as a "blanket") it may optionally be cut into sections for packaging, storing and shipping. Two or more layers may be combined into a laminated blanket if desired, and the final product may optionally be rolled.

Binders

"Binders" are well known in the industry to refer to organic agents or chemicals, often polymeric resins, used to adhere inorganic or polymeric base fibers to one another in a three-dimensional structure that is compressible and yet regains its loft when compression is removed. Binders are typically delivered as an aqueous dispersion of the binder chemical, which may or may not be soluble in water. "Binder dispersions" thus refer to mixtures of binder chemicals in a medium or vehicle. Dispersions may have more specific names depending on the nature of the dispersed phase and the nature of the vehicle or medium; but "dispersions" as used herein is generic for all such mixtures, including but not limited to true solutions, colloids, emulsions and suspensions.

Binder concentrates have been described, having a relatively high, fixed concentration, e.g. 20-40%, of binder solids, but these have been subsequently diluted with a binder "diluent" (typically more water) to produce a diluted "binder dispersion" having a lower concentration, e.g. 10%, of binder. This diluted, "ultimate" binder dispersion is then sprayed or dispensed on the fibers.

Binders fall into two broad, mutually exclusive classes: Thermoplastic and Thermosetting. See generally Allcock, Harry R., et al., Contemporary Polymer Chemistry, 3rd ed., Pearson Education, Inc., 2003, incorporated herein by reference. A thermoplastic material may be repeatedly heated to a softened or molten state and will return to its former state upon cooling. In other words, heating may cause a reversible change in the physical state of a thermoplastic material (e.g. from solid to liquid) but it does not undergo any irreversible chemical reaction. As Allcock states: "Basically, a thermoplastic is any material that softens when it is heated." (Allcock, p. 12) Exemplary thermoplastic polymers include polyvinyls, polyethylene terephthalate (PET), polypropylene or polyphenylene sulfide (PPS), nylon, polycarbonates, polystyrene, polyamides, polyolefins, and certain copolymers of polyacrylates.

In contrast, "[t]he term thermosetting polymer refers to a range of systems which exist initially as liquids but which, on heating, undergo a reaction to form a solid, highly crosslinked matrix." (Allcock, p. 15) Thus, thermosetting compounds comprise reactant systems—often pairs of reactants—that irreversibly crosslink upon heating. When cooled, they do not regain their former liquid state but remain irreversibly crosslinked. "In practical terms, an uncrosslinked thermoplastic material can be re-formed into a different shape by heating; a thermosetting polymer cannot." (Allcock, p 16).

The reactants useful as thermosetting compounds generally have one or more of several reactive functional groups: e.g. amine, amide, carboxyl or hydroxyl. As used herein, "thermoset compound" (and its derivative clauses like "thermosetting compound," "thermosetting binder" or "thermoset binder") refers to at least one of such reactants, it being understood that two or more may be necessary to form the crosslinking system characteristic of thermosetting compounds. In addition to the principle reactants of the thermosetting compounds, there may catalysts, process aids, and other additive as described below.

Phenolic/formaldehyde binders comprise a thermosetting binder system that has been extensively used in the past. Some manufacturers have attempted to use formaldehyde-free binder systems. Two main approaches to formaldehyde-free, thermosetting binder systems have been developed. First, there are the polyacrylic acid and polyol polymers. An example is the polyacrylic acid/polyol/polyacid acid binder system described in U.S. Pat. Nos. 6,884,849 and 6,699,945 to Chen, et al., the entire contents of which are expressly incorporated herein by reference.

A second category of formaldehyde-free, thermosetting binders are referred to as "bio-based" or "natural" binders. "Bio-based binder" and "natural binder" are used interchangeably herein to refer to binders made from nutrient compounds, such as carbohydrates, proteins or fats, which have many reactive functionalities. Because they are made from nutrient compounds they are very environmentally friendly. Bio-based binders are described in more detail in U.S. Patent Publication 2011/0086567, to Hawkins et al., filed Oct. 8, 2010, the entire contents of which are expressly incorporated herein by reference.

Both thermoplastic and thermosetting binders may be used with the invention. In some though not all embodiments, the binders are fiberized. Thermoplastic binders may be fiberized simultaneously with the glass fiber formation, a process known as co-fiberization, as taught in U.S. Pat. Nos. 5,523,031 and 5,523,032 to Ault, et al and U.S. Pat. Nos. 5,458,822, 5,490,961 and 5,736,475 to Bakhshi, et al. More recently, co-owned patent application publication number US 2012-0244337 A1 to Gavin, filed on Mar. 23, 2011 and titled: FIBERIZED THERMOSET BINDER AND METHOD OF USING, describes a process by which thermosetting binders can be fiberized. This disclosure is also incorporated herein in its entirety. Briefly, Gavin has found that increasing the solids content to at least about 35%, and optionally as high as 50%, 75%, 80% or 90% will cause a corresponding increase in room temperature viscosity from about 30 cps to as high as 50 cps, 100 cps 1000 cps, or even 10,000 cps. With such high solids content and/or viscosity, the aqueous thermosetting dispersion can be formed into fibers by any of a variety of processes, including but not limited to extrusion through a die under pressure, rotary spinning under centrifugal force, or melt blowing the fibers. These thermoplastic and/or thermosetting fibers may be used in the present invention.

When binder is applied as a fiber, it may be intermingled with the inorganic fiber in any of a variety of ways. For example, the fibers may be blended in carding operation, as is typical for textile fibers. Alternatively, the two types of fibers may be uniformly dispersed and blended within a fluid, as in a conventional wet-laid process (the fluid being water) or a conventional air-laid process (the fluid being air).

Figure 2:
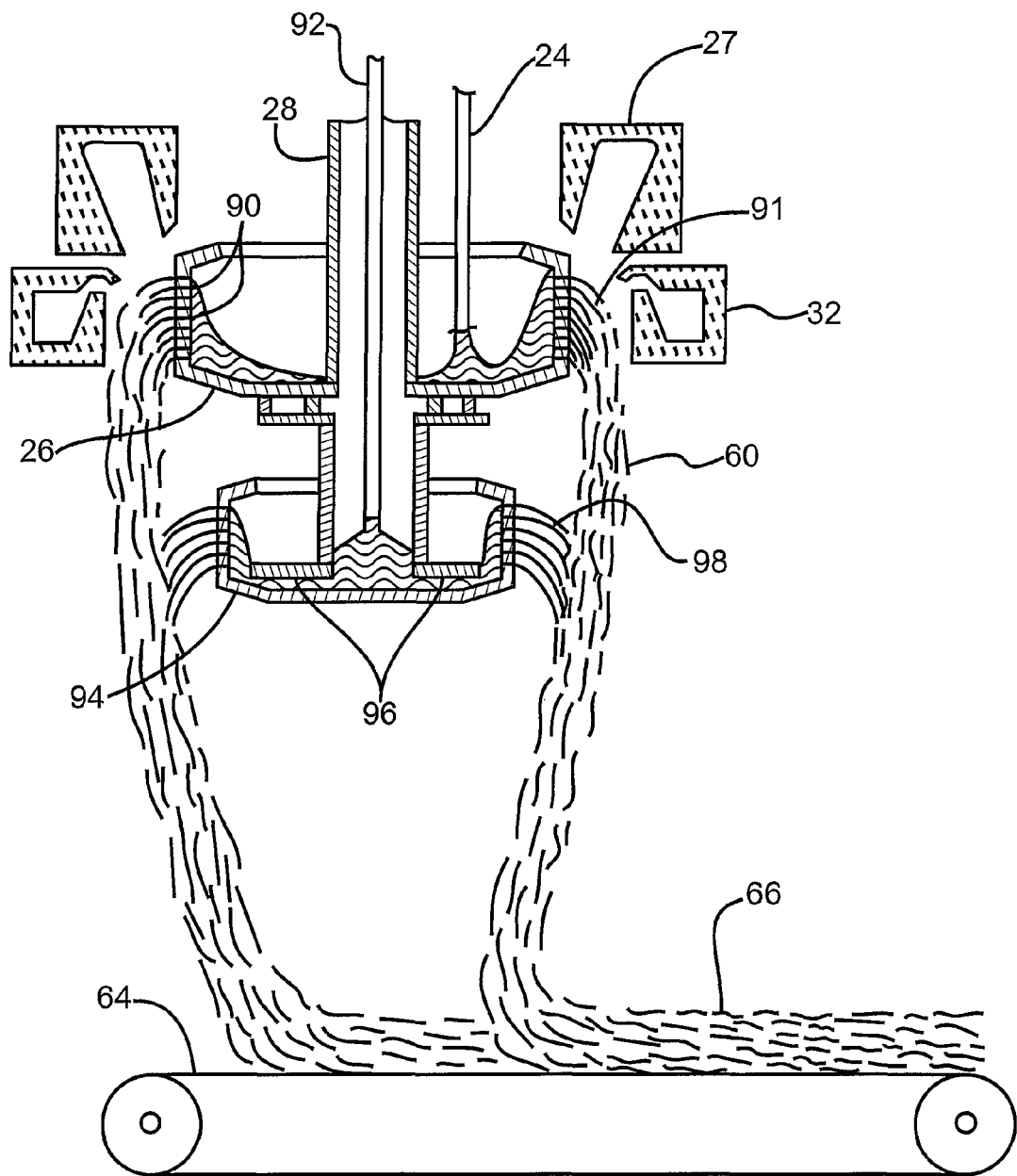
FIG. 2 is an enlarged schematic view of an apparatus for cofiberizing and distributing a thermoset binder intermingled with glass fibers in a fibrous product.

In some embodiments, the thermoset fiber is spun simultaneously with formation of the base fiber in a process known as co-fiberization. FIG. 2 illustrates a co-fiberization apparatus, as well as an enlarged view of a single spinner 26 shown in FIG. 1. As described above, a stream of molten glass 24 flows into a spinner 26, which may optionally be heated by a burner 27. The spinner 26 is rotated about a shaft 28 such that the molten glass is forced to pass through tiny holes or orifices 90 in the circumferential sidewall of the spinner 26 to form primary base fibers 91. Blowers 32 direct a gas stream, typically air, in a substantially downward direction to impinge the fibers, turning them downward and attenuating them into secondary fibers that form a veil 60 that is forced downwardly.

For co-fiberization, the shaft 28 may be hollow, so that a conduit 92 may be inserted in the interior of shaft 28 to deliver thermosetting binder to a secondary spinner 94 which contains a well 96 of thermoset binder at the bottom of the secondary spinner 94. Secondary spinner 94 also rotates about the axis of conduit 92 to spin thermosetting fibers 98 outwardly through tiny orifices in the sidewall of secondary spinner 94. The secondary spinner 94 may be attached to and rotate at the same rate as the spinner 26, or they may be decoupled and rotate at different speeds. These thermosetting fibers 98 intermingle with the base fibers in the veil 60 as it is directed downward to the conveyor to form a fibrous pack 66 of base fibers comingled with thermoset binder fibers. Such a configuration and its operation have been described in more detail in U.S. Pat. Nos. 5,523,031 and 5,523,032 to Ault, et al., in connection with the delivery of thermoplastic or molten polymer binders. That disclosure is incorporated herein by reference so that further description here is not necessary.

Opacifying Agents

The fibrous products include at least one opacifying agent. An opacifying agent is any compound or composition that improves the radiation component of the thermal resistivity (or conversely reduce the thermal conductivity) of an insulation product as compared to a control insulation product not having the opacifying agent. Because radiation is mostly transferred in the near- to mid-infrared (IR) region of the spectrum, it is preferable that the opacifying agent block (absorb or scatter) radiation in the IR region between about 0.75 and 25 µm in wavelength, and especially in the region of from about 1 to about 8 µm.

The opacifying agent may be any of a wide variety of compounds that achieve the required blocking of radiation energy. A number of metals, in the form of flakes and/or reflective coatings, and metal oxides possess this capability. Aluminum, in particular has been shown to function as an IP opacifier, as has iron oxide, chrome oxide, and silicon carbide. Carbon compounds have also demonstrated an ability to block IR transmission. Carbon in the form of carbon black, graphite, nanographite, graphene and the like are suitable opacifying agents. As is known in the art, graphene is a planar, monolayer of carbon atoms in honeycomb-like sp2 bonds. Graphite consists of multiple layers of graphene stacked upon one another. Carbon black is an alternative crystalline structure of carbon. In other embodiments, the infrared opacifying agent can be any material, including any metalized substrate such as for example metalized mica, sufficient to absorb and reflect infrared radiation at specific infrared radiation wavelengths.

Figure 3A:
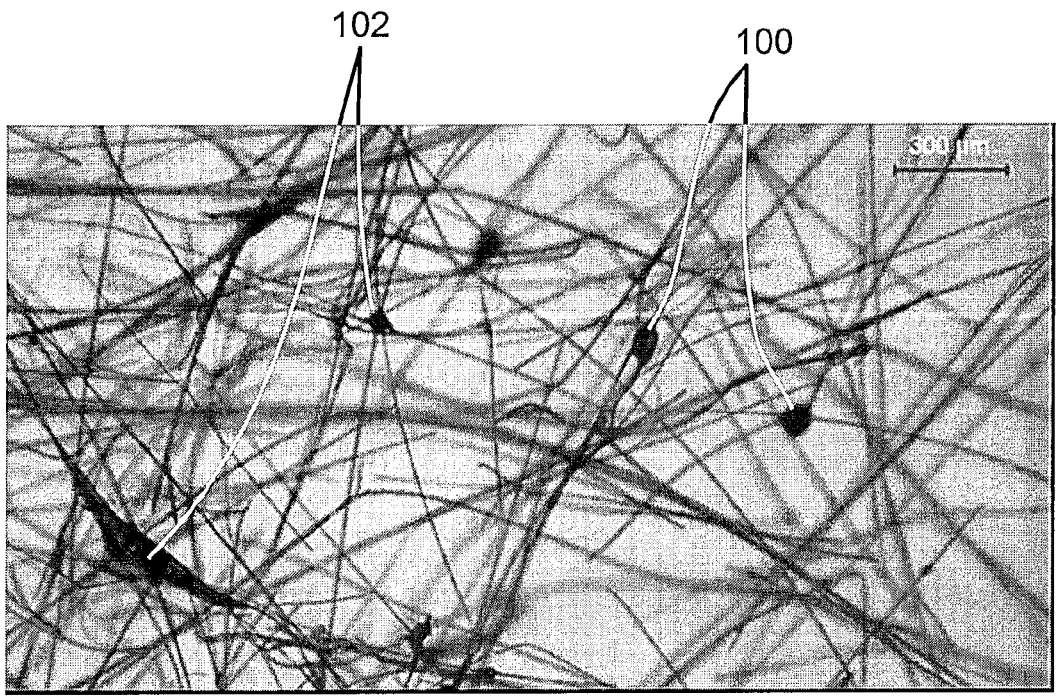
FIGS. 3A and 3B are magnified micrographs illustrating the non-uniform application of opacifier concentrated at nodes (3A); and the substantially uniform distribution or coating of opacifier particles throughout the length of the fibers (3B)

The opacifying agent is substantially uniformly coated on the surface of the base fiber, typically glass. "Substantially uniformly coated" means that the opacifying agent is distributed rather evenly along the entire length of the base fiber, rather than at intersections or nodes. This "coating" may be particulate or in layers; and it may be essentially continuous or it may be discontinuous. In discontinuous embodiments there are no extended gaps in coverage. If any gaps exist they are relatively small and well spaced apart. FIG. 3 illustrates this concept and the distinction. FIG. 3A shows a fibrous matrix that was sprayed with an aqueous mixture of binder with graphite included as an opacifier. Due to the surface tension of this aqueous mixture, the binder and graphite both tend to accumulate on the strands—either as agglomeration points 100 or at fiber-fiber nodes 102. While having binder at the fiber-fiber nodes is desirable for binding the fibers together, it is undesirable to concentrate the graphite opacifying agent at the nodes, leaving large inter-node gaps in coverage.

Figure 3B:
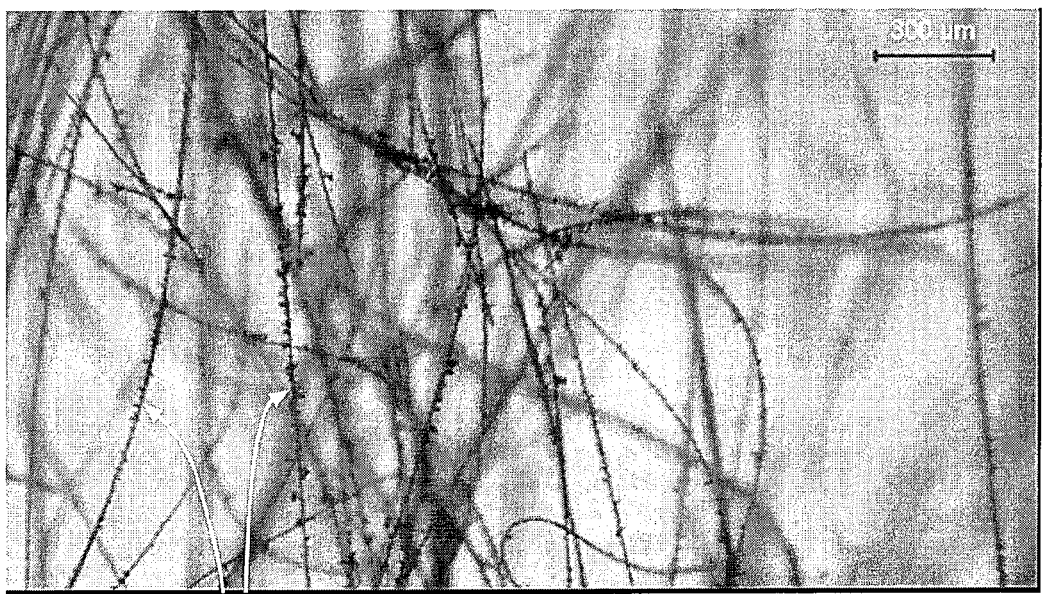

In contrast, FIG. 3B shows a fibrous matrix in which opacifying particles are distributed much more evenly and uniformly along the length of each fiber (e.g. strand segments labeled 110), which is the more desired state for improved radiation blocking. As seen in FIG. 3B, the opacifier particles adhering along the length of the glass fibers are spaced apart from each other, generally by an average distance in a range from about 0.1 µm to no more than about 50 µm, typically from about 2 µm to about 25 µm or from about 2 to about 15 µm. More generally, the maximum gap of exposed base fiber between particles or particle groups should generally not exceed 3-10 times the diameter of the fiber.

Figure 4A:
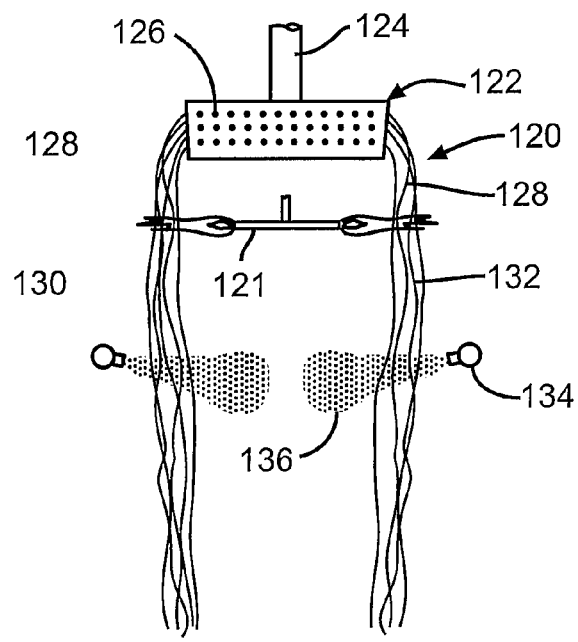
FIGS. 4A and 4B illustrate alternative embodiments for applying an opacifying agent to glass fibers, and then applying a binder.

Ideally, the surface of the fibers are nearly completely coated with a thin, IR-reflective coating of an opacifying agent, e.g. from about 100% coated to about 50% coated. Such a coating may be applied in the form of an aqueous size or, alternatively, by passing the glass through a sooty flame. A sooty flame is produced when a combustion process is carried out with low oxygen levels. FIG. 4A illustrates a flame device 120 arranged below a rotary fiberizer 122. The rotary fiberizer rotates on a shaft 124 and has a plurality of small orifices 126 from which strands or fibers 128 of glass are extruded under centrifugal force, in much the same way as was described for FIG. 1. The flame device 120 includes a flame distributor nozzle or jet 121 that is configured to deprive the flame of oxygen, thereby delivering a sooty flame 130 and coating the veil of glass fibers 128 as they are attenuated downwardly from the rotary spinner 122. The coating may be essentially a monolayer of carbon—e.g. a graphene—or a thicker graphite layer, and this thickness may vary over the length of the coated fibers. After the flame provides a substantially uniform coating of an opacifying agent, the coated fibers 132 continue to descend toward a conveyor (not shown). At some point in the path of the descending fibers 130, a binder applicator device 134 applies or sprays a binder composition 136 to the coated fibers 130. In FIG. 4A, the binder composition is sprayed onto the fibers. Thereafter, the fibers are collected in any suitable manner, such as on a conveyor chain as described with FIG. 1.

Figure 4B:
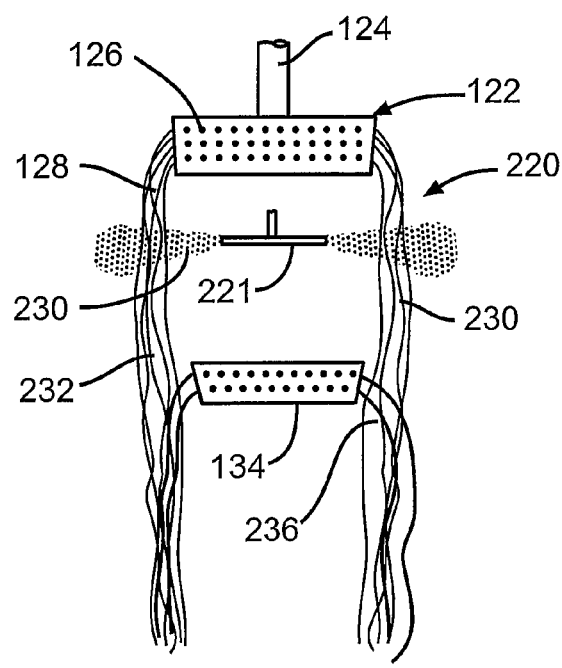

As an alternative to a thin, layered coating, particulate opacifying agents can be attached to the fibers as a "coating", as is represented in FIG. 3B. The characteristics of such particulates will be described momentarily. In this case, an opacifying agent can be included in a sizing composition that is sprayed on the base fibers from a sprayer disposed below a rotary spinner as shown in FIG. 4B. In FIG. 4B, a rotary spinner 122 operates (with comparable as identified in FIG. 4A) as described above. As the veil of fibers 128 descends, a sizing composition containing an opacifier 230 is sprayed from a sprayer 221 to form opacified fibers 232. On the opacified fibers 232, a thin coating of particulates preferably coat the base fiber substantially uniformly along the entire length of the fiber, such that gaps in coverage are minimal and there are no extended gaps in coverage. Coverage may again be from about 50% to 100% of the base fiber. Opacifier coatings may also be applied by other means, such as physical blending of particulates with a fibrous matrix and shaking or vibrating the matrix to improve distribution into the matrix.

Sizing compositions are well known in the art (see. e.g. U.S. Pat. No. 6,399,198, 5,998,029 or 5,700,574 for examples, the entire content of each is incorporated herein by reference). Generally, glass fiber sizing is not a single chemical compound, but a mixture of several complex chemistries, each of which contributes to the sizing's overall performance. The primary components are the film former, which forms a resin film on the glass strands, and the coupling agent, which serves primarily to bond the fiber to the resin. The film former typically serves a number of functions, for example, to protect and lubricate the fiber and hold fibers together prior to molding, yet also to promote their separation when in contact with resin, ensuring wetout of all the filaments. Film formers, with some exceptions, are chemically similar to the matrix resin for which the sizing is designed. Exemplary film forming resins include poly (lower alkylenes) like polyethylene, polypropylene, polybutylene, etc.; and polycaprolactones; as well as resins sold under trade names DURACET and COVINAX. The coupling agent, almost always an alkoxysilane compound such as Silquest A1100 (3-aminopropyltriethoxysilane), or A174 (gamma-methacryloxpropyltrimethoxysilane) serves to bond two highly dissimilar materials—the glass fiber, which is hydrophilic, bonds to a resin that is hydrophobic. Silanes have a silicon end that bonds well to glass and an opposing organic end that bonds well to resins.

Beyond these two major components and in addition to the opacifying agent, sizings also may include additional agents, such as lubricating agents, surfactants, de-dusters, oils, anti-static compounds, and/or other protectants. Including additives for specialized functions, a sizing formulation might contain eight to ten or more components. The interaction of these components with each other, with the matrix resin, and within a particular converting/fabricating environment is quite complex, yet reasonably well understood by sizing chemists. Exemplary opacifying agents suitable for inclusion in an opacifying size composition include Aquadag® E colloidal graphite (available from Acheson Industries, Port Huron, Mich. and Henkel Corporation, Madison Heights, Mich.) dispersions containing up to 22% solids and from about 5-10% graphite (by weight). Generally, such opacifying agents are used in diluted form in sizing compositions having graphite concentrations in the range of from about 0.1 to about 10% by weight, e.g. from about 0.2 to about 5%, or about 0.1 to 4%.

When the opacifying agent is a particulate sprayed in an aqueous dispersion 230, it is generally preferred to use a fiberized binder described above and shown in FIG. 4B in order to avoid washing the opacifying agent to the nodes with an aqueous binder spray. Thus, a secondary fiberizer 234 as described above with reference to FIG. 2 is situated below the size sprayer 221. The secondary fiberizer 234 is supplied with a viscous thermoset binder which is extruded as binder fibers 236 which are comingled with the opacified fibers 232 to form a fibrous pack on the conveyor.

In some embodiments, the opacifying agent is a particle. In generally, preferred infrared opacifier particles have a substantially planar and often irregular shape. This permits characterization in terms of three dimensions: (1) a thickness (the smallest dimension and in a range from about 0.001 µm to about 5.0 µm, more typically in a range from about 0.01 µm to about 2.0 µm); (2) a major dimension (the longest dimension and in a range from about 1 µm to about 20 µm); and (3) a minor dimension in the range of from about 0.1 µm to about 5 µm. The planar shape of the infrared opacifier particles is conducive to provide additional surface area of the opacifier particles thereby increasing the ability of the opacifier particles to resist radiant heat transfer through the insulation product. Such particles may have a major dimension that is sized as a function of the diameter of the glass fibers. As one example, the particles may have a major dimension in a range from about 4-5 µm corresponding to a glass fiber diameter of approximately 5 µm. In another example, as the diameter of the glass fiber increases, the major dimension of the particles also increases. In one embodiment, the ratio of the major dimension of the particles to the diameter of the glass fibers is in a range from about 0.5 to about 1.5.

In other embodiments, the infrared opacifier particles may have a substantially spherical shape. Spherical particles can have a diameter in a range from about 0.1 µm to about 5 µm. Alternatively, the particles can have any shape, such as for example cubic, sufficient to resist radiant heat transfer through the insulation product. Some spherical particles may be solid graphite or may be graphite coated onto a substrate, such as a glass microbead, these particles being applied to mineral fibers to create the "substantially uniform coating" as described above.

It should be appreciated however, that the dichotomous treatment in the discussion of a "surface coating" on the one hand, and "particle" on the other hand is to some extent artificial. A layer of particles spaced sufficiently close together approximates a "coating" and a graphene coating may be viewed as a large cylindrical or tubular "particle." The distinction blurs at the boundaries, but the difference is that opacifier is distributed all along the length of the fibers and not concentrated at nodes.

It should also be appreciated that the base fibers form the fibrous matrix and thus are distributed throughout the fibrous product. Consequently, by coating the base fibers substantially uniformly with the opacifying agent, the opacifying agent is similarly distributed throughout the fibrous product. This is important in contributing to the improved thermal resistivity, since it has been found that opacifying agents applied to the surface of a fibrous product penetrate only a short distance into the matrix, and are not as effective in improving thermal resistivity as opacifier uniformly distributed throughout the matrix.

EXAMPLES

Example 1: Aqueous Opacifying Agent Dispersions

An aqueous sizing composition is prepared having a polyvinylacrylic film forming resin such as DUROCET or COVINAX, and an alkoxysilane coupling agent such as A174 and A1100. Suitable wetting agents or surfactants may be added as well. To this size composition is added Aquadag® E colloidal graphite to a final concentration of about 4% by weight. This size is applied to glass fibers spun from a rotary fiberizer by spraying the veil below the spinner.

Example 2: Thermoset Binder Fibers

Thermoset binder having a dry weight composition of 76.2% maltodextrin, 19% citric acid and 4.8% sodium hypophosphite, was prepared in varying concentration sample dispersions, including one with a solids content of 70%. Thermoset fibers were prepared from this 70% sample dispersion in the lab at room temperature using a 6 inch diameter plastic rotary spinner spun at 1200 rpm and having a single orifice having a diameter of 0.041 inches. Samples of the spun fiber were examined by scanning electron microscopy (SEM) and by transmitted light optical microscopy at 400× magnification with a digital filar eyepiece. The distribution of fiber diameters (100 pts) was determined to be as set forth in Table 1, below.

TABLE 1

Thermoset fiber diameters

| Diameter (μm) | % in each size category |
| --- | --- |
| 1 to 3 | 15 |
| 3 to 5 | 25 |
| 5 to 7 | 21 |
| 7 to 9 | 11 |
| 9 to 11 | 9 |
| 11 to 13 | 6 |
| 13 to 15 | 5 |
| >15 | 8 |
| Total | 100 |

Example 3: Fibrous Products

The opacifying size composition of Example 1 is sprayed onto glass fibers spun down to form small sample handsheets of unbonded glass fibers. Thermoset fibers as prepared in Example 2 are then blown down onto the sample handsheet using a low-pressure annular blower located next to the spinner. The handsheet bearing the thermoset binder fibers is removed and a second unbonded handsheet is placed on top, with the thermoset binder fibers between the two unbonded handsheets. This sandwich is placed in a lab oven and cures to bond the two handsheets of opacified fibers together into a fibrous product.

Example 4: Glasswool Fibrous Products and Conductivity

Glasswool samples were formed in a dual hole bushing from bicomponent fiber in a manner similar to the teachings of U.S. Pat. No. 3,073,05 to Tiede, which yields a curly fiber, giving loft to the wool pack. A Vortek air amplifier pulls a continuous fiber from the bushing which is then collected by suction onto a screen. Triplicate samples of bare fiber (as control) and fibers substantially uniformly coated with either carbon black or graphite were prepared. The carbon black was applied by allowing a sooty flame to be pulled into the air amplifier along with the fiber to coat the fiber with soot. The graphite (Aquadag E from Henkel Corporation) was applied as a 0.5% to 1% water suspension to a pad which contacted the fiber above the air amplifier.

These glasswool samples were then packed into an 8" diameter cylindrical space cut from standard R4.2 bindered glass wool insulation (approximately 1.25 inches thick) at a density close to that expected to yield an R value of 4.2. The thermal conductivity of each sample was measured according to ASTM C518 using a FOX heat flow instrument (from LaserComp, Saugus, Mass.) with a 4" by 4" meter area. This procedure allows thermal measurements to be made on a relatively small sample.

The samples produced are described in Table 2 below. In each case the wool with the coating was fairly uniformly dark gray indicating the presence of a reasonable coating of the opacifier.

TABLE 2

Sample description

| Sample # | Sample description |
| --- | --- |
| 1-3 | bare glass; 2120 F bushing; 40 psi blower |
| 5-7 | soot addition; 2120 F bushing; 40 psi blower |
| 9-11 | graphite addition; 2120 F bushing; 25 psi blower |
| 12-14 | bare glass; 2120 F bushing; 25 psi blower |

Note:
Designations 4 and 8 are intentionally skipped.

The diameter of the glass wool fibers produced depends on the bushing temperature and the blower (air amplifier) pressure. Temperature remained constant, but blower pressure varied, creating fibers of differing diameters; samples 1-7 have a smaller fiber diameter than samples 9-14. At equivalent mass densities and in the diameter range relevant here, smaller diameter fibers have more surface area to produce more scattering of thermal radiation and therefore improved thermal resistance/conductivity. Consequently, samples 1-7 should not be compared directly with samples 9-14. However, samples 1-3 may be compared with samples 5-7 to show the effect of uniformly coated carbon black and samples 9-11 may be compared with samples 12-14 to show the effect of uniformly coated graphite on conductivity relative to bare glass.

Example 5: Conductivity Measurements on Unbonded Fibrous Product

Figure 5A:
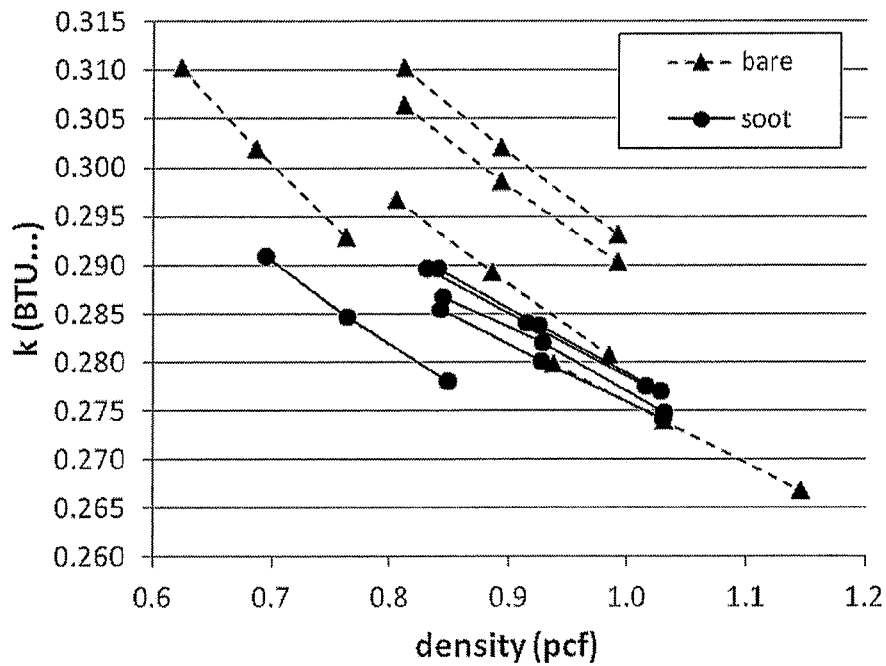
FIGS. 5A and 5B illustrate thermal conductivity data from insulation samples having no binder as described in Examples 4 and 5.
Figure 5B:
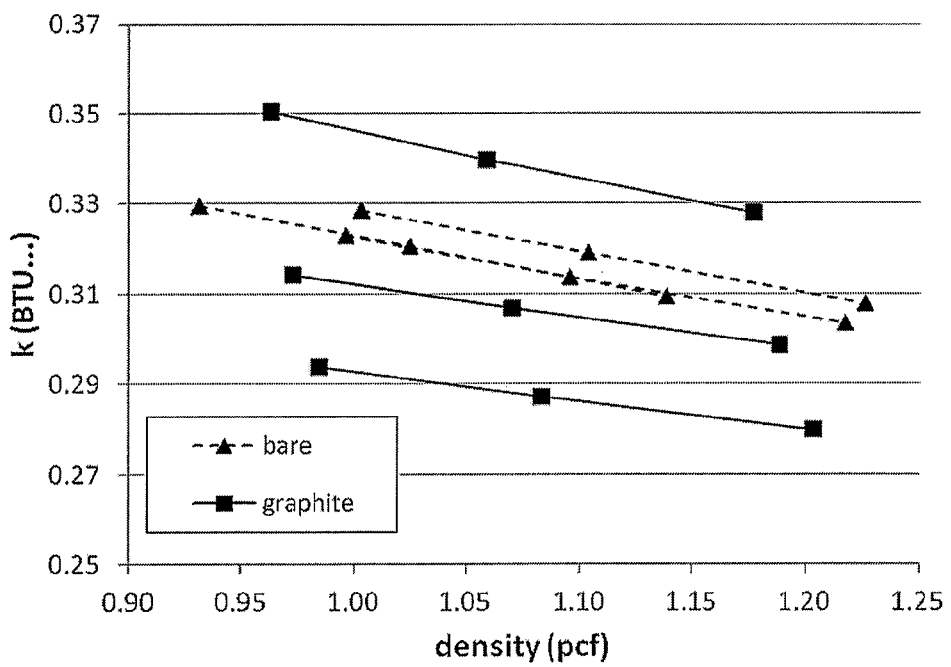

For the first set of measurements, the samples of Example 4, unbindered in any way, were stuffed as uniformly as possible into the cylindrical space in the R4.2 insulation. Then the thermal conductivity was measured at three different densities by compressing the entire sample to different degrees. The results are displayed in FIGS. 5A and 5B, which plot the conductivity against the density. The Y-axis plots conductivity or "k-value" with units of BTU*in/hr*ft$^2$*° F. (abbreviated "k-(BTU . . . )" in the Figures.) Replicate samples, used to assess variability in the test, can be identified by identical X-axis density values.

Each sample shows the expected decrease in thermal conductivity with increasing density, but there is some variability. The replicated soot sample results exhibit very similar conductivities, but the bare glass samples exhibit more variability.

The data suggest that uniformly distributed carbon black reduces the thermal conductivity. The data further suggest that graphite may as well. The unexpected variability may be due to the unbonded, loose-fill nature of the insulation, and the difficulty in quantifying the density in the central 4"×4" portion of the sample which dominates the thermal conductivity result.

Example 6: Conductivity Measurements on Bindered Fibrous Product

In an attempt to reduce the variability associated with loose-fill glasswool fibers, binder was applied to the packs to more accurately assess the density of the central 4"×4" part of the sample. For bare glass and soot-coated samples, this was done by mechanically dispersing a particulate thermoset binder throughout the sample and vibrating the sample, confining the sample in the 8" diameter×1.25" high cylindrical space, and heat treating at 300 F for 15 minutes to set the binder. This yielded reasonably well-defined wool packs for bare glass and soot-coated fibers, however it was observed that the density was not uniform from top to bottom, with bottom density being higher and the rest of the pack having a lighter density. This has a detrimental effect on thermal conductivity of the sample relative to one having a uniform density.

For the three graphite-coated samples, the binder did not adhere well so a different approach was used. The graphite-coated fibers were heated to 752 F for at least 15 minutes, which is sufficient to allow the glass fiber to relax slightly and assume the shape to which it is confined. The density uniformity of the graphite-coated packs was acceptably uniform.

Figure 6A:
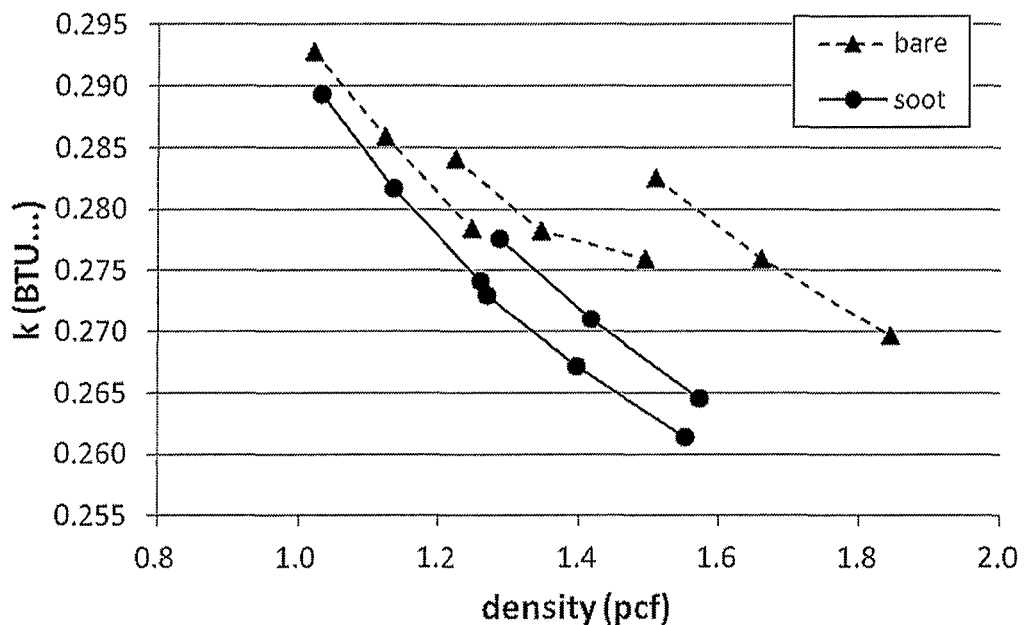
FIGS. 6A and 6B illustrate thermal conductivity data from insulation samples having binder applied as described in Example 6.
Figure 6B:
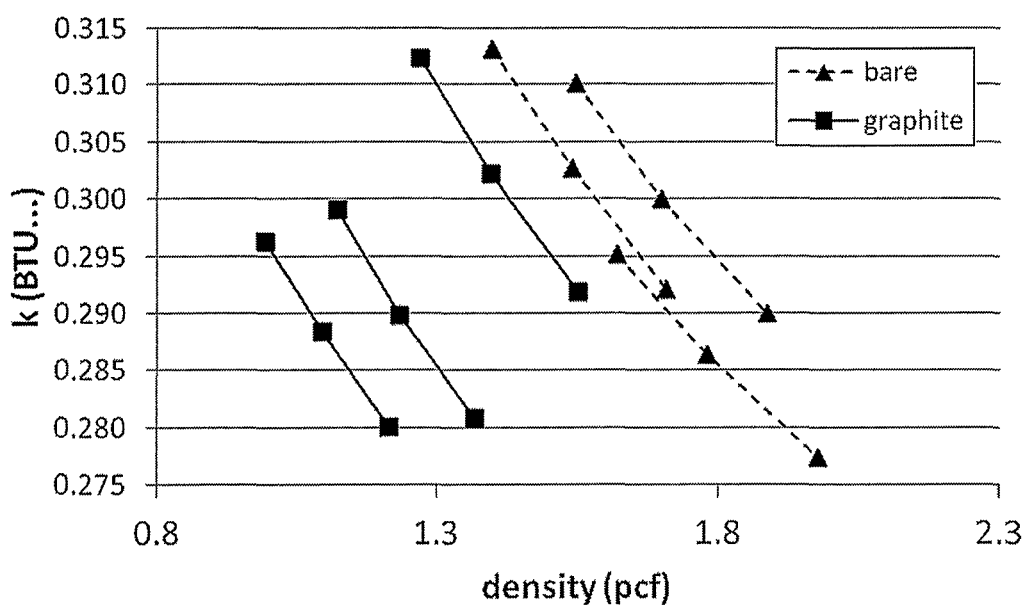

The packs were then assessed for conductivity as in Example 5. The results are displayed in FIGS. 6A and 6B, which plot the conductivity against the density. The Y-axis plots conductivity or "k-value" with units of BTU*in/hr*ft$^2$*° F. (abbreviated "k-(BTU . . . )" in the Figures.)

These results suggest that both the soot and graphite opacifier coatings reduced the thermal conductivity compared to bare glass, with the effect of graphite being greater than the soot. It is unknown, however, to what degree the conductivity performance of the graphite-coated fibers benefited from the more homogeneous density properties.

The principle and mode of operation of this invention have been described in its preferred embodiments. However, it should be noted that this invention may be practiced otherwise than as specifically illustrated and described without departing from its scope.

What is claimed is:
1. A method of making a fibrous insulation product, comprising:

coating inorganic base fibers with an aqueous composition comprising an opacifying agent to provide an opacified base fiber that is substantially uniformly coated with opacifying agent, contacting the opacified base fiber with a binder, after coating the inorganic base fibers with the aqueous composition comprising the opacifying agent, to form a matrix of bindered opacified base fibers, wherein the binder is applied without removing the coating of opacifier on the base fiber such that the opacified base fibers remain substantially uniformly coated with opacifying agent, wherein the fibrous insulation product has greater thermal resistivity than an otherwise identical fibrous product made with otherwise identical base fibers that are not coated with the opacifying agent.

2. The method of claim 1, wherein said opacifying agent is selected from carbon black, graphite, nanographite, graphene, iron oxide, chrome oxide, silicon carbide, and a metalized substrate.

3. The method of claim 2, wherein the step of coating produces a thin layer of graphite, nanographite, or graphene.

4. The method of claim 1, wherein the step of contacting the opacified base fiber with a binder comprises comingling the opacified base fiber with a binder fiber to form a matrix of opacified base fibers and binder fibers; and further including curing the binder to bind the opacified base fibers in the matrix.

5. The method of claim 4, wherein the comingling of the opacified base fiber with the binder fiber is achieved by a process selected from co-fiberization, wet-laid dispersion, air-laid dispersion, and carding.

6. The method of claim 4, wherein the binder fiber is prepared by fiberizing a thermoplastic binder.

7. The method of claim 4, wherein the binder fiber is prepared by fiberizing a thermosetting binder composition.

8. The method of claim 7, wherein the thermoset binder fiber is fiberized from an aqueous dispersion having at least one of the following properties: (a) a viscosity of at least about 30 cps at room temperature; and (b) a concentration of solids of at least about 35%.

9. The method of claim 1, wherein the aqueous composition comprising an opacifying agent is a sizing further comprising a film former and a coupling agent.

10. The method of claim 1, wherein the step of contacting the opacified base fiber with a binder comprises sandwiching a layer of binder fibers between two layers of opacified base fibers to form a matrix of opacified base fibers and binder fibers; and further including curing the binder to bind the opacified base fibers in the matrix.

11. A fibrous insulation product comprising:
a matrix of inorganic base fibers coated with an aqueous composition comprising an opacifying agent to provide an opacified base fiber that is substantially uniformly coated with opacifying agent, said matrix comprising a curable thermosetting or thermoplastic binder applied to the opacified base fibers, after the base fibers are coated with the aqueous composition comprising the opacifying agent, to bind the opacified base fibers in the matrix without removing the coating of opacifier on the base fiber such that the opacified base fibers remain substantially uniformly coated with opacifying agent, wherein the fibrous insulation product has greater thermal resistivity than an otherwise identical fibrous product made with otherwise identical base fibers that are not coated with the opacifying agent.

12. The fibrous insulation product of claim 11, wherein said opacifying agent is selected from carbon black, graphite, nanographite, graphene, iron oxide, chrome oxide, silicon carbide, and a metalized substrate.

13. The fibrous insulation product of claim 12, wherein the opacifying agent is a thin layer of graphite, nanographite, or graphene.

14. The fibrous insulation product of claim 12 wherein the opacifying agent comprises particles having a substantially planar shape.

15. The fibrous insulation product of claim 11 wherein the opacifying agent comprises an essentially continuous coating.

16. The fibrous insulation product of claim 11 wherein the opacified base fiber includes gaps of exposed base fiber not coated with opacifying agent extending no more than about 10 times the diameter of the fiber.

17. The fibrous insulation product of claim 11, wherein the binder comprises a comingled thermoset binder fiber that is cured to bind the opacified base fiber.

* * * * *